United States Patent
Wang

[11] Patent Number: 6,031,653
[45] Date of Patent: Feb. 29, 2000

[54] LOW-COST THIN-METAL-FILM INTERFERENCE FILTERS

[75] Inventor: Yu Wang, Pasadena, Calif.

[73] Assignee: California Institute of Technology, Pasadena, Calif.

[21] Appl. No.: 09/141,843

[22] Filed: Aug. 27, 1998

Related U.S. Application Data

[60] Provisional application No. 60/057,150, Aug. 28, 1997, and provisional application No. 60/059,243, Sep. 18, 1997.

[51] Int. Cl.[7] .................................. G02F 1/03; G02B 1/10
[52] U.S. Cl. .......................... 359/247; 359/580; 359/586; 359/589; 359/722; 359/291; 428/403
[58] Field of Search .................................. 359/247, 290, 359/291, 618, 722, 577, 580, 582, 586, 589, 359, 360; 428/403, 402

[56] References Cited

U.S. PATENT DOCUMENTS

| | | | |
|---|---|---|---|
| 4,367,921 | 1/1983 | Sawamua et al. | 359/586 |
| 5,563,734 | 10/1996 | Wolfe et al. | 359/360 |
| 5,570,847 | 11/1996 | Phillips et al. | 359/580 |
| 5,571,624 | 11/1996 | Phillips et al. | 428/403 |
| 5,595,825 | 1/1997 | Guiselin | 359/589 |
| 5,914,804 | 6/1999 | Goossen | 359/247 |
| 5,935,702 | 8/1999 | Macquart et al. | 359/359 |

*Primary Examiner*—Loha Ben
*Attorney, Agent, or Firm*—Fish & Richardson P.C.

[57] ABSTRACT

Interference filters and filter arrays based on thin-metal film interference filters having at least one dielectric layer formed between two thin-metal films to form a Fabry-Perot cavity.

13 Claims, 9 Drawing Sheets

LOW-COST THIN-METAL-FILM INTERFERENCE FILTERS

This application claims the benefit of the U.S. Provisional Application Nos. 60/057,150, filed on Aug. 28, 1997 and 60/059,243, filed on Sep. 18, 1997, which are incorporated herein by reference.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to bandpass filters, and more specifically, to optical interference bandpass filters.

BACKGROUND

Optical wavelength filters can be used to change the spectral composition of an incoming beam to achieve an output beam of a desired wavelength or within a certain wavelength range. One class of optical wavelength filters is bandpass filters which transmit light within a desired spectral transmission window. The transmission window is centered at a selected center wavelength and has a selected bandwidth.

Bandpass filters have been used in many color display systems to filter one or more light beams of a white light source to produce colors, such as the primary colors red, green, and blue. Each passband filter is designed to transmit one color defined by a selected center wavelength and a spectral range. Colors outside the spectral range are rejected.

Some flat panel displays, such as color liquid crystal displays ("LCDs") in portable computers, use color filter arrays in which each pixel includes three color filters corresponding to three different colors. Many LCDs use dye color filters to form the color filter arrays. Such dye color filters are expensive and have a low transmission efficiency of only about 60%.

Another implementation of the color filter array uses dielectric interference filters. Such filters are well known in the art. A typical dielectric interference filter is formed of alternating dielectric layers with different indices of refraction. The alternating dielectric layers can be configured to produce a transmission window at a desired center wavelength with a desired bandwidth.

The multi-layer interference filters can be easily configured to achieve a desired transmission window such as a notch shape. However, it often requires over ten layers of alternating different dielectric layers to produce desired color filtering and transmission efficiency. Since different colors require different multi-layer structures, a color filter array based on such interference filters are complex in its structure and expensive to manufacture. For example, at least thirty masking processes are needed to form the filters for three colors if each color requires at least ten dielectric layers.

SUMMARY

The present disclosure provides thin-metal film interference filters having at least one dielectric layer formed between two thin-metal films to form a Fabry-Perot cavity.

One embodiment of such filters includes two transparent substrates coated with thin-metal films of a thickness less than the optical penetration depth and a piezo-electric spacer disposed between the substrates to engage the substrates in such a way that the thin metal films face each other to form an air gap therebetween. The thin metal films and the air gap form a tunable Fabry-Perot cavity. The cavity length is adjustable by using a control electrical signal to vary the dimension of the piezo-electric spacer. The total optical length of the two metal films and the air gap is less than one wavelength and greater than one half of the wavelength.

Another embodiment is a multilayer thin-metal interference filter which includes at least three metal layers and two dielectric layers to form two Fabry-Perot cavities that are optically coupled to each other through a common metal layer. The dielectric and metal layers can be configured to transmit different colors.

A color filter array can be formed on a single substrate based on the multilayer thin-metal filter. Each element has three color filters for transmitting different colors. Different color filters have the same structure for the metal films but different structures for the dielectric layers.

These and other aspects and associated advantages of the present invention will become more apparent in light of the following detailed description, the accompanying drawings, and the claims.

DETAILED DESCRIPTION OF THE PREFERRED EMBODIMENTS

The simplest thin-metal film interference filter has a dielectric layer sandwiched between two identical reflecting metal films. The thickness of the metal films is less than the penetration depth for the electromagnetic radiation of interest to allow partial transmission of the radiation (e.g., about 10%). The penetration depth is the depth from a surface of a metal at which the electrical field of an incident radiation reduces by a factor of 1/e. In the RF spectral range, this penetration depth is referred to as "skin depth".

This three-layer structure forms a single Fabry-Perot cavity. The filtering operation is based on the interference of multiple beams caused by the multiple reflections at the thin metal films within the cavity. The transmission of such filters has multiple transmission peaks defined by $Mc/2(2n_m L_m + n_d L_d)$, where M is an integer representing the longitudinal modes of the cavity, c is the speed of light, $n_m$ and $n_d$ are respectively the indices of refraction of the metal films and center dielectric layer, and $L_m$ and $L_d$ are respectively the thicknesses of the metal films and the dielectric layer. The spectral spacing between two adjacent peaks is the free spectral range, $c/2(2n_m L_m + n_d L_d)$. The transmission peaks of such a filter can be tuned by changing the thickness of the dielectric layer. The bandwidth can be increased or decreased by increasing or decreasing the index of the refraction of the dielectric layer, n.

Figure 1A:
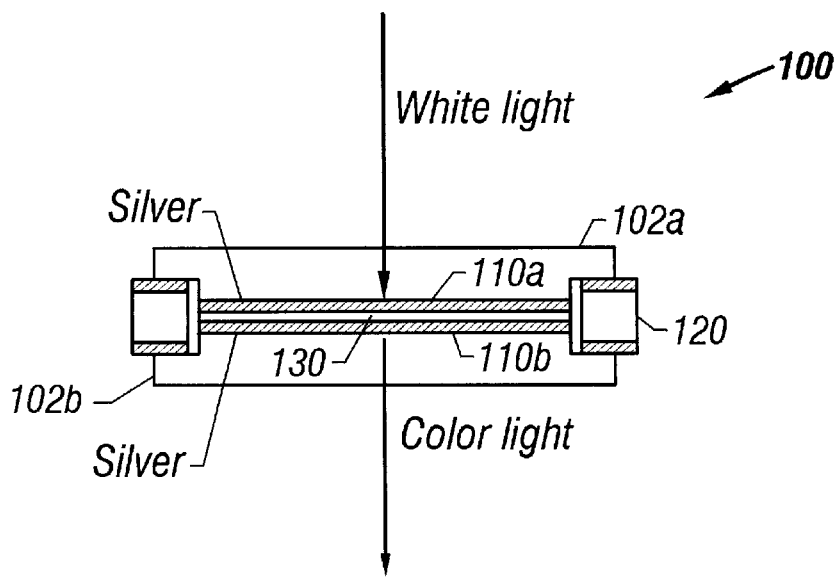
FIG. 1A is a diagram illustrating a tunable three-layer thin-metal-film interference filter having a cavity spacer formed of a piezo-electric element.

Such a three-layer thin-metal filter can be used to form a tunable Fabry-Perot filter. FIG. 1A shows one embodiment 100. Two transparent substrate plates (e.g., glass) 102A and 102B are spaced from each other by engaging to a piezoelectric element 120 to form an adjustable air gap 130 therebetween. Two opposing surfaces of the substrate plates 102A and 102B are coated with thin metal films 110A and 110B, respectively. The two thin metal films 110A, 110B and the center air gap 130 form a tunable Fabry-Perot cavity. The transmission of the filter 100 is tuned by changing the thickness of the air gap 130. An external electrical control unit 140, for example, can be used to supply a control voltage to the piezo-electric element 120, thereby changing the dimension of the piezo-electric element 120 and so the air gap 130.

In operation, the spectral portion of an incident light within the transmission window is transmitted through the filter 100 as a colored transmitted beam while the remaining light is reflected. When a white incident beam is used, the color of the transmitted light is complementary to the color of the reflected beam.

One unique aspect of the Fabry-Perot filter 100 is its short cavity length. Unlike many conventional Fabry-Perot filters whose optical length of the cavity is many times longer than the operating wavelength, the optical length of the cavity for the filter 100 is less than one wavelength and is sufficiently large to produce at least one longitudinal cavity mode ($M \geq 1$).

The number of longitudinal mode M is given by $2(2n_m L_m + n_d L_d)/\lambda$, where $\lambda$ is the wavelength of the incident light. Hence, the minimum optical cavity length ($2n_m L_m + n_d L_d$) is one half of the wavelength for supporting at least one mode in the cavity. A preferable value of the optical cavity length ($2n_m L_m + n_d L_d$) is less than one wavelength but greater than one half of the wavelength for producing a single transmission peak. The total thickness of the three layers 110A, 130 and 110B, i.e., ($2L_m + L_d$), can be set at about one half of the wavelength. This is the distance from the glass-metal interface on the substrate plate 102A to the glass-metal interface on the substrate plate 102B.

The above cavity configuration can produce a single transmission peak within a tunable spectral range of interest (e.g., the visible range from about 380 nm to about 780 nm or the infrared range from 780 nm to about 1.5 μm). This feature allows such a single cavity filter to eliminate two or more transmission peaks in a spectral range of interest present in a single-cavity Fabry-Perot cavity with a cavity length much longer than one wavelength.

Another aspect of the filter 100 is the use of the thin metal films 110A and 110B instead of dielectric mirrors in a short Fabry-Perot cavity with an optical length less than one wavelength (nL<λ). In the above short-cavity filter, any surface irregularity or defect can adversely reduce the peak transmission when the transmission peak is narrow (i.e., the reflectivity of the end reflectors is high). This is in part because the optical path of each ray within such a short cavity (nL<λ) can be more significantly affected by such surface irregularities or defects than in a cavity with a cavity optical length much greater than one wavelength.

Many conventional single-cavity Fabry-Perot filters use high-quality dielectric mirrors as the end reflectors to limit the dimension of the surface irregularities or defects within an acceptable range for a desired peak transmission and transmission bandwidth.

The present invention uses thin metal films rather than high-quality dielectric mirrors as end mirrors for a Fabry-Perot cavity to achieve a high peak transmission and to significantly relaxes the requirement of optical surface quality of the end reflectors. More specifically, the thin metal films are used to broaden the bandwidth of the transmission. This ensures significantly overlapping of different transmission peaks of different optical path lengths caused by surface irregularities or defects in the metal films. The peak transmission of the actual transmission peak of the cavity will not be significantly reduced since the actual transmission peak is the average of the these overlapped peaks.

The transmission broadening of the thin metal films 110A and 110B is effected by a combination of the inherent dispersion and absorption of the metal films. Conventional dielectric end mirrors do not have such broadening effect. Hence, using the metal films increases the tolerance on the surface quality of the end mirrors. This reduces the cost of the tunable filter 100 since high-quality optical surfaces are expensive.

Figure 1B:
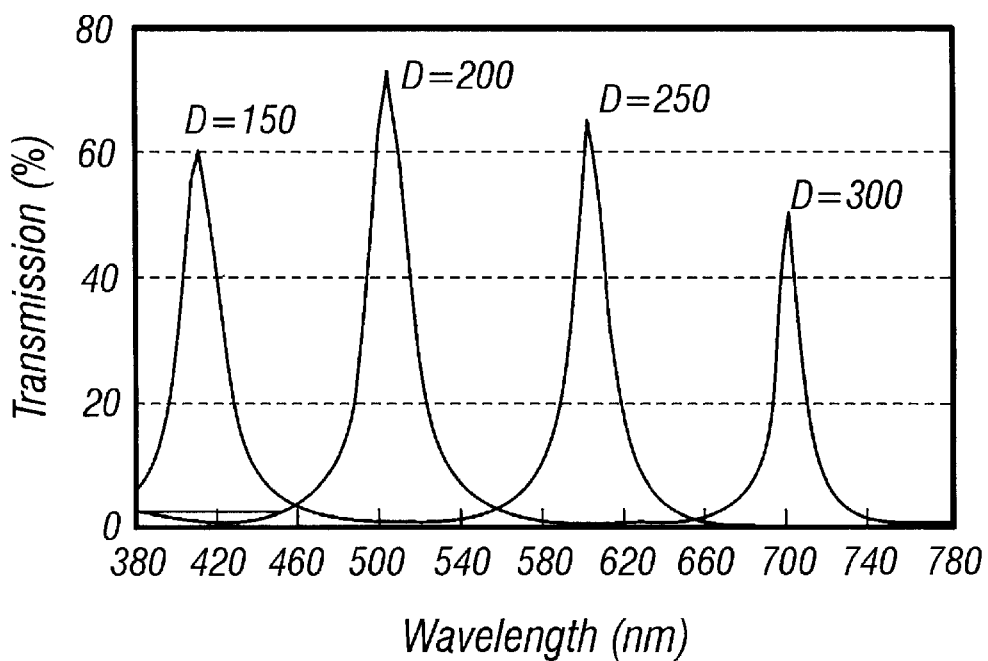
FIG. 1B is a plot showing transmission spectra of a three-layer interference filter based on the design of FIG. 1A with silver metal films.

FIG. 1B shows the calculated transmission spectra of the tunable filter having two silver films of 40 nm as the metal films 110A and 110B. As the air gap 130 increases from 150 nm to 300 nm, the transmission peak shifts from 410 nm in blue to 700 nm in red. Transmission peaks for air gaps of 150 nm, 200 nm, 250 nm, and 300 nm are shown. The bandwidth of the transmission peak is about 20 nm in full width at half maximum.

Figure 1C:
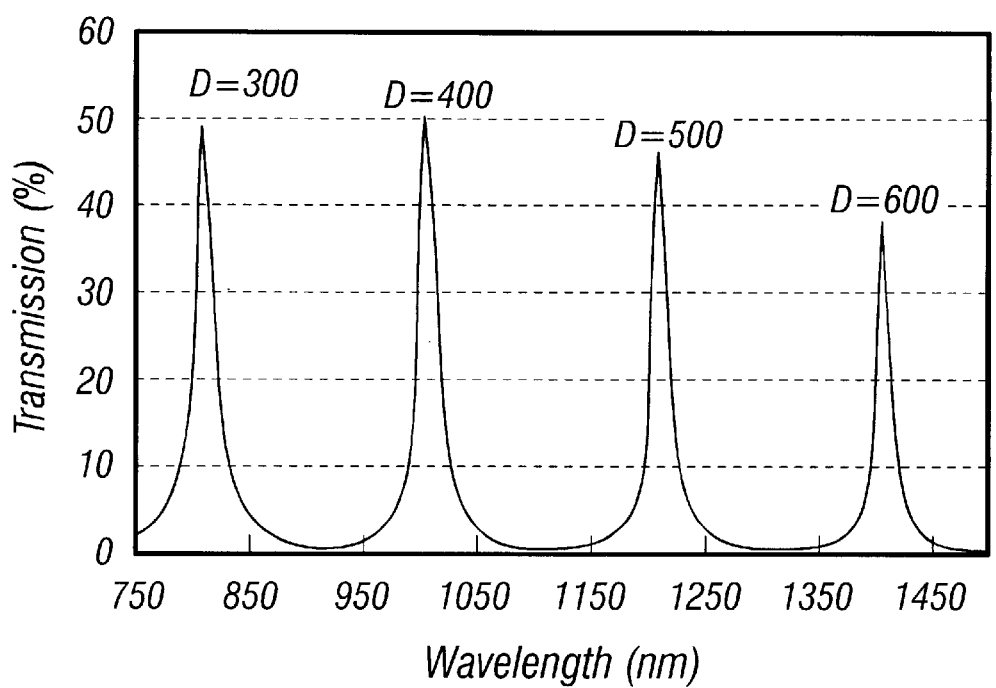
FIG. 1C is a plot showing transmission spectra of a three-layer interference filter based on the design of FIG. 1A with potassium metal films.

The thin metal films 110A and 110B are less than the penetration depth and the composition of the metal films strongly affects the transmission wavelength of the filter 100. Thin silver films are preferably used to produce tunable transmission in the visible range as shown in FIG. 1B. Aluminum films can be used to replace the silver films to shift the tunable range towards blue. Potassium films can be used to achieve a tunable transmission in the infrared range. FIG. 1C shows the transmission wavelengths of the filter 100 using potassium films of 100 nm as the metal films 110A and 110B under different thicknesses of the air gap 130.

The simple thin-metal film filter 100 can be configured to work in a wide range of temperatures (e.g., from about 0K to about 500K) and is very power efficient due to the use of piezo-electric element 120. In remote sensing and other color imaging applications, such filters can be advantageously used to replace acoustic-optical tunable filters and liquid crystal tunable filters. The acoustic-optical filters are usually complex in structure and power-consuming. The liquid crystal tunable filters have low optical efficiency due to use of absorbing dyes and can only work in a narrow temperature range within which the liquid crystal material retrains its unique liquid crystal phase (e.g., from about 0° C. about 90° C.).

The transmission spectral profile of the three-layer thin-metal film filter 100 has a Gaussian-like profile which falls off rapidly from its center transmission wavelength. In certain color filtering applications, however, it is often desirable to achieve a "notch"-like transmission window (i.e., a notch filter) which has a sharp transition between a transmissive spectral region and a non-transmissive spectral region and a relatively constant transmission within the transmission window. For example, a notch filter with a bandwidth of about 100 nm or greater may be desirable.

The inventor discovered that the spectral profile of the transmission of a thin-metal film filter can be changed from the Gaussian-like profile to other desirable shapes by implementing two or more Fabry-Perot cavities that are optically coupled together.

Figure 2A:
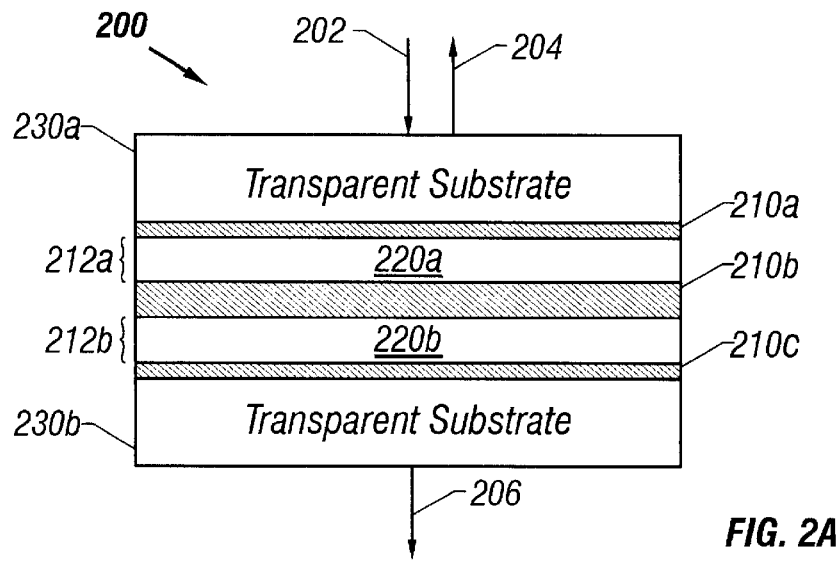
FIG. 2A is a diagram showing a thin-metal-film interference filter that has three metal layers and two dielectric layers to form two coupled Fabry-Perot cavities.

FIG. 2A shows a thin-metal-film interference filter 200 having two coupled Fabry-Perot cavities. Three metal layers 210a, 210b, 210c and two dielectric layers 220a, 220b are formed relative to one another to form two cavities 212a and 212b. The first cavity 212a is formed by the metal layer 210a, the dielectric layer 220a, and the metal layer 210b. The second cavity 212b is formed by the metal layer 210b, the dielectric layer 210b, and the metal layer 210c. The metal layer 210b is shared by two cavities and provides the optical coupling therebetween.

Each of the metal layers 210a, 210b, 210c may be formed of a thin metal film to achieve transmission in the visible spectral range from about 200 nm to about 750 nm for color display applications. For example, thin gold or silver films may be used. In one embodiment, a silver film less than about 100 nm thick, or more preferably about 40 nm thick, is used. The dielectric layers 220a and 210b are configured to have different thicknesses for transmitting different colors and may be formed of such materials like $MgF_2$, $SiO_2$, NaF, or LiF. The thickness of the metal films 210a, 210b, and 210c may remain the same for transmitting different colors. This significantly simplifies the manufacturing of a color filter array. Transparent substrates 230a and 230b (e.g., formed of a glass) are used to protect the multi-layer stack.

Similar to the three-layer filter 100, when a white beam 202 is incident to the filter five-layer filter 100, the color of the transmitted light 206 is complementary to the color of the reflected beam 204.

In general, the center wavelength of the transmission is determined by the optical thickness of the dielectric layers 220a and 220b. As the optical thickness increases, the center wavelength of the transmission increases. The spectral profile and the peak transmission primarily depend on the properties of the thin metal films 210a, 210b, and 210c, such as metal composition and film thicknesses. For example, when silver is used to form the metal films, thinner metal layers lead to higher transmission peaks and broader bandwidth.

The shared coupling metal layer 210b is in general thicker than the two end metal layers 210a and 210c. The thickness of the coupling metal layer 210b determines the amount of coupling between the two adjacent cavities 212a and 212b. As the thickness of the coupling metal layer 210b increases, the coupling increases or vice versa. Strong coupling may lead to a transmission profile having two transmission peaks while weak coupling can lead to a narrow transmission bandwidth with a low peak transmission.

Similar to design of multilayer dielectric interference filters, the electric field distribution in each layer is calculated according to respective boundary conditions. Unlike the dielectric layers in the multilayer dielectric interference filter, each metal layer in the thin-metal film filters has not only the real index of refraction that produces the optical refraction but also the imaginary index of refraction that produces the optical absorption. The unique combination of these metal layers and the dielectric layers produces many unique properties and advantages of the thin-metal film filter 200.

For example, the coupling metal layers and the end metal layers have different thickness values. In a dielectric interference filter, all dielectric layers have the same optical thickness, i.e., one quarter wavelength. Hence, for different dielectric filters with different center transmission wavelengths, different thicknesses are required. For different thin-metal film filters with different center transmission wavelengths based on the filter 200, however, the metal films can be the same but the dielectric layers are different. This aspect of the filter 200 has significant advantages in forming a color filter array.

For another example, a greater difference in the indices of refraction between a metal layer and a dielectric layer in the thin-metal film filter 200 can be achieved than that in the indices of refraction between different alternating dielectric layers in a dielectric interference filter. This allows the filter 200 to achieve a desired transmission profile and peak transmission with much less number of layers compared to a dielectric interference filter.

Figure 2B:
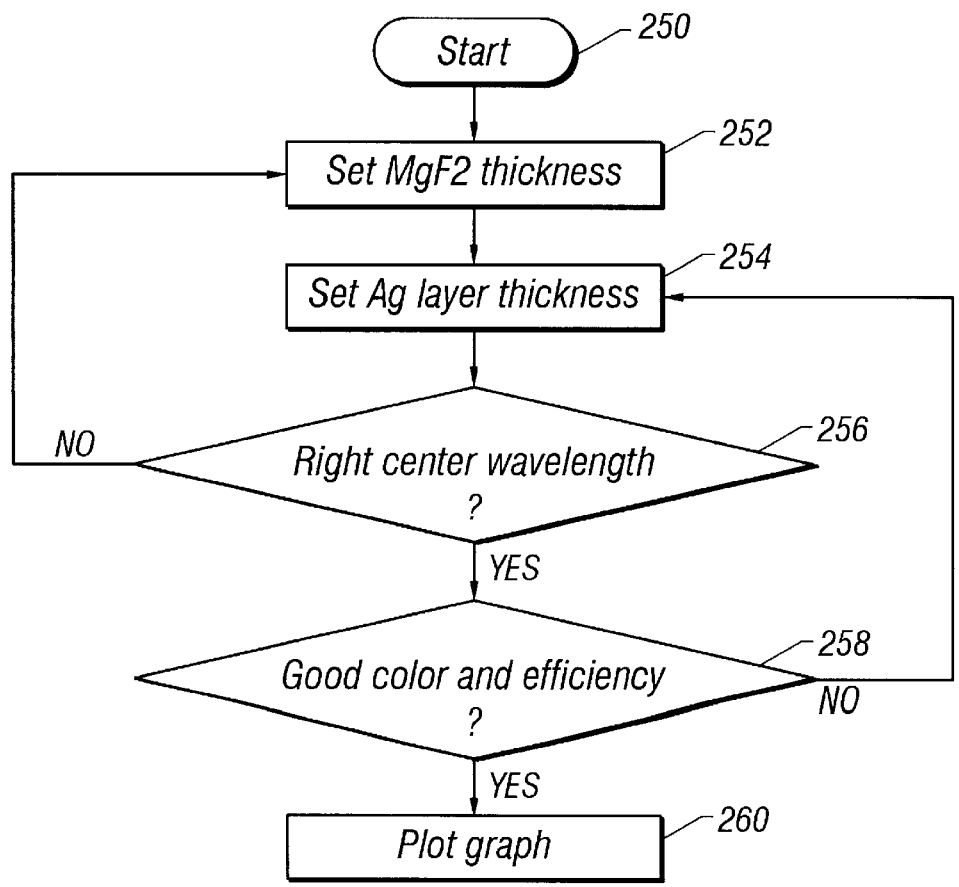
FIG. 2B is a flowchart of one design process of a thin-metal-film filter having at least two coupled Fabry-Perot cavities.

FIG. 2B is a flowchart showing a design process of a thin-metal film filter with two or more coupling cavities. At step 250, materials of the metal layers and the dielectric layers are chosen. At step 252, the thickness of the dielectric layers is set. At step 254, the thickness of the coupling metal layers and the thickness of the end metal layers are set. Next, coupled wave equations with proper boundary conditions are sloven to determine the transmission. Two decisions are needed. First, it is determined whether the center transmission wavelength is at a desired wavelength. If not, the step 252 is repeated to select another thickness for the dielectric layers. Otherwise, it is determined whether the transmission efficiency and the spectral profile (e.g., bandwidth and the shape of the transmission window) meet the requirements. If not, the step 254 is repeated. The above process is iterated until the transmission meet the desired requirements.

TABLE 1

|  | Ag | $MgF_2$ | Ag | $MgF_2$ | Ag |
|---|---|---|---|---|---|
| Blue Filter | 23 nm | 110 nm | 40 nm | 110 nm | 23 nm |
| Green Filter | 23 nm | 150 nm | 40 nm | 150 nm | 23 nm |
| Red Filter | 23 nm | 185 nm | 40 nm | 185 nm | 23 nm |

Figure 3A:
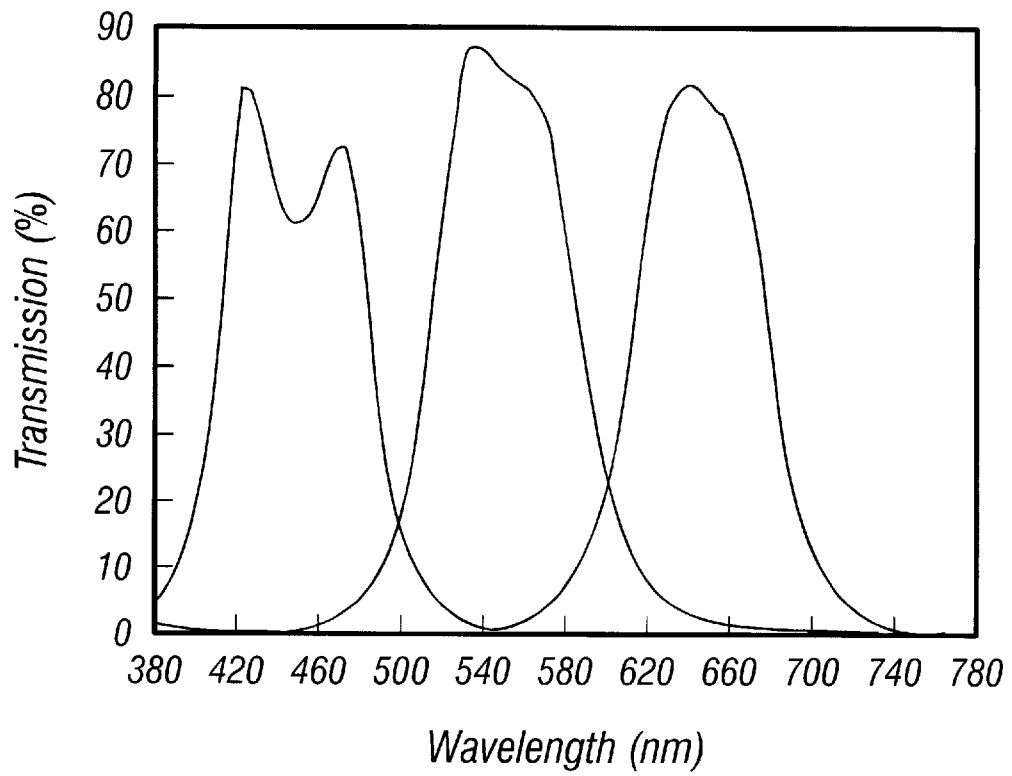
FIGS. 3A and 3B are plots respectively showing measured transmission and reflection spectra of three $MgF_2$—Ag metal-film interference filters with different thickness values for the $MgF_2$ dielectric layers to produce red, green, and blue filters.
Figure 3B:
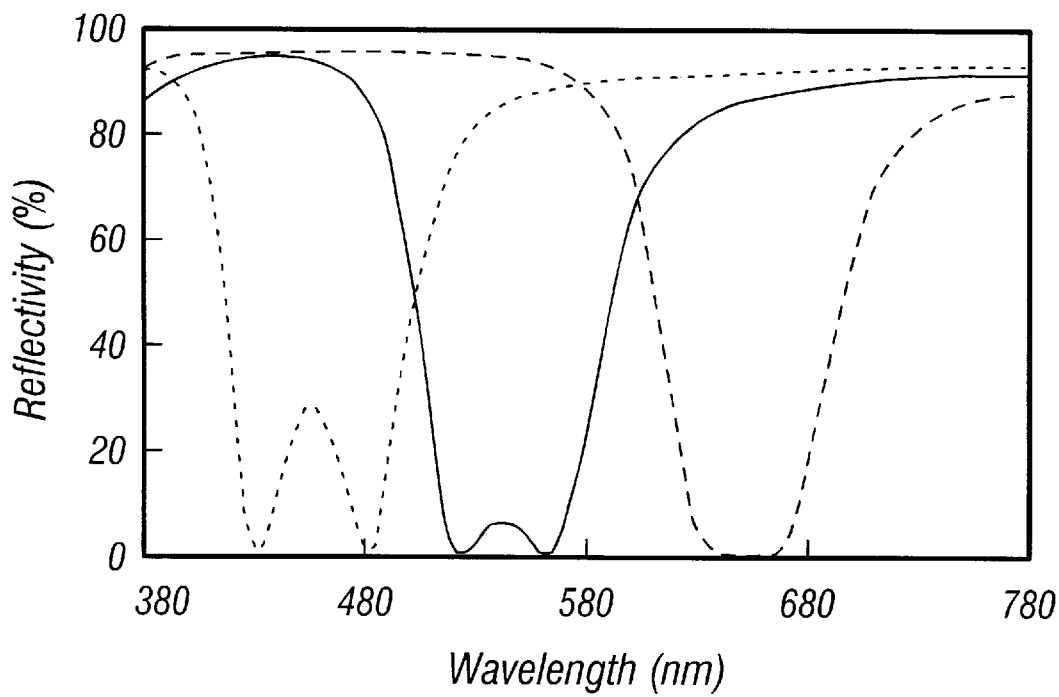

FIG. 3A shows measured transmission spectra of three $MgF_2$—Ag metal-film interference filters based on the filter 200 with different thickness values for the $MgF_2$ dielectric layers to produce red, green, and blue filters. The structures of the three filters are listed in Table 1. Note that the shared Ag layer in the center is thicker than the other two Ag layers. As the thickness of both $MgF_2$ layers changes from 110 nm, to 150 nm, and to 185 nm, the wavelength of the peak transmission changes from 420 nm (blue), to 540 nm (green), and to 640 nm (red), respectively. A relatively high transmission of above 80% can be achieved in all three colors. FIG. 3B shows the spectra of the reflected light. The bandwidth of each transmission peak about 100 nm, which is desirable for display applications.

Figure 3C:
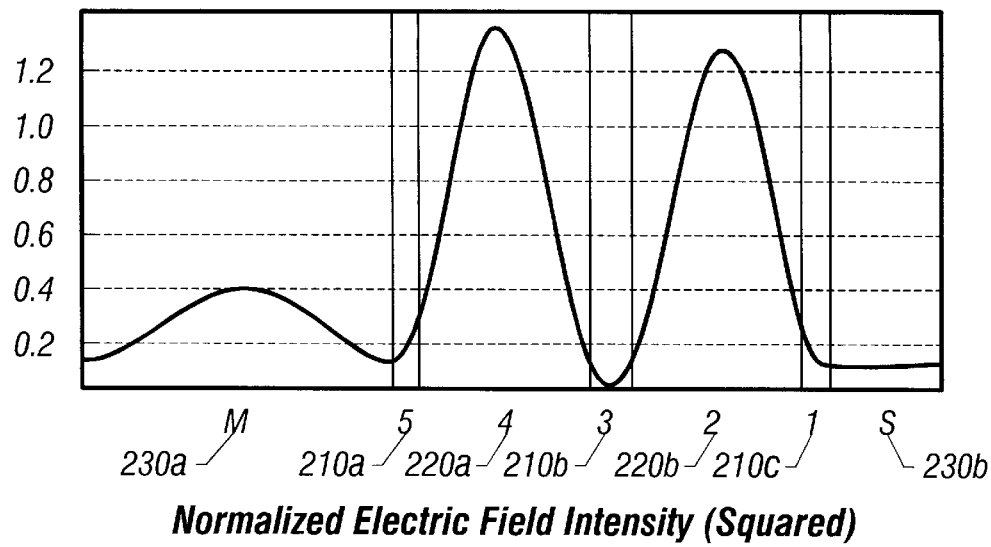
FIG. 3C is a plot showing calculated spatial distribution of the electric field in the layers of a $MgF_2$—Ag metal-film interference filter based on the design in FIG. 2A.

FIG. 3C shows the calculated distribution of the electrical field in each layer of the 5-layer thin-metal film filter 300. Due to the using of metal films, the maximum field inside each dielectric layer is over three times of the incident field shown in the region M. In the coupling metal layer 210b, however, the minimum field is nearly zero.

Figure 3D:
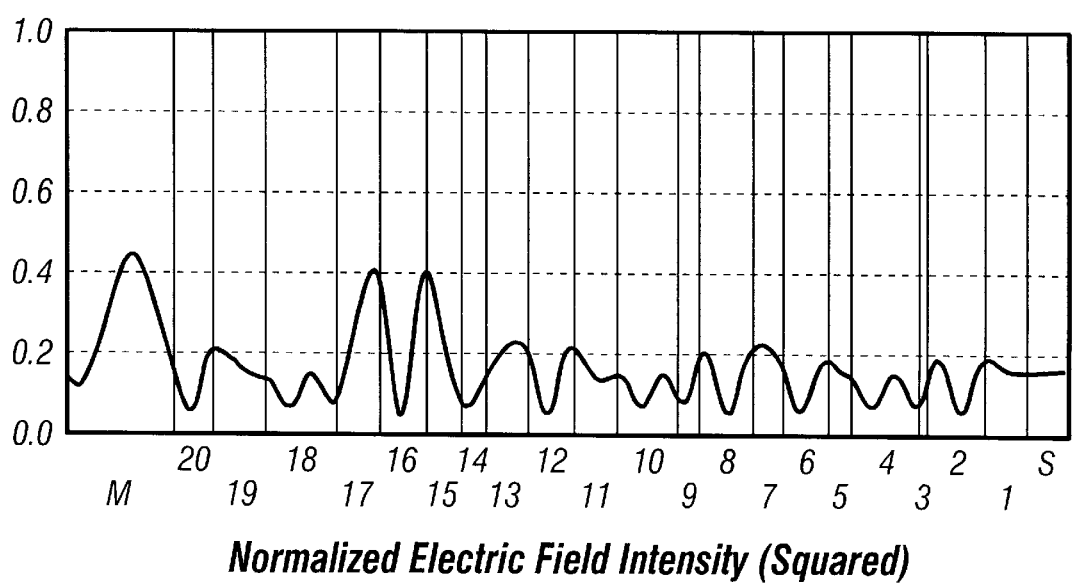
FIG. 3D is a plot showing calculated spatial distribution of the electric field in the layers of a conventional dielectric interference filter formed of alternating $MgF_2$ and $TiO_2$ layers.

As a comparison, the distribution of a 20-layer dielectric interference filter formed of alternating MgF2 and TiO2 layers is shown in FIG. 3D. The maximum field within the stack is less than the incident field and the minimum field is significantly above zero.

Figure 4:
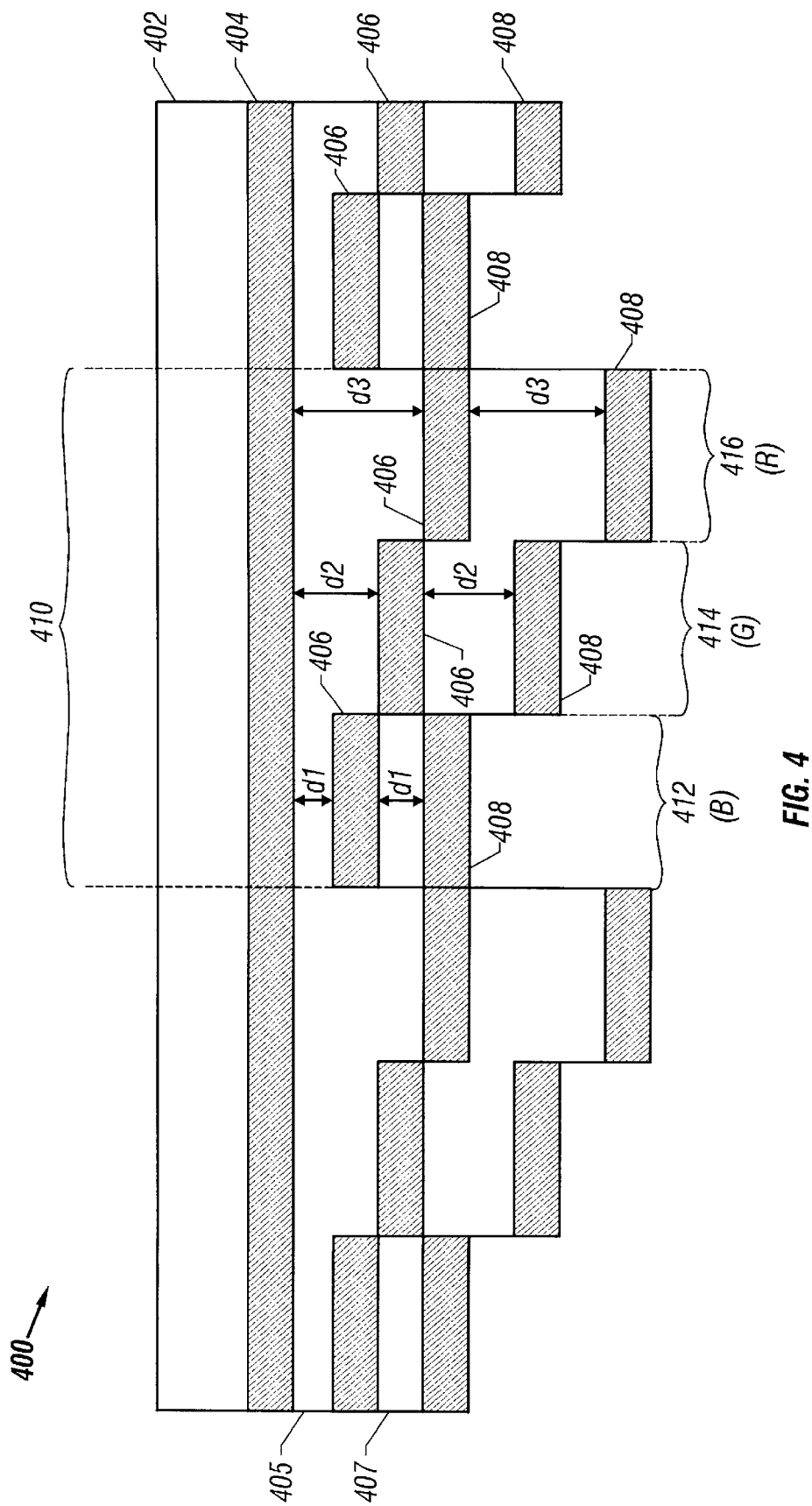
FIG. 4 is a diagram showing three different color filters in one color pixel of a filter array based on the a five-layer thin-metal-film filter having two coupled Fabry-Perot cavities.

The 5-layer thin-metal-film interference filter 200 of FIG. 2A can be used to form a color filter array 400 illustrated in FIG. 4. The filter array 400 has a substrate 402 which may be a transparent glass or include a spatial light modulate array for producing images such as a liquid crystal panel. A plurality of color filter pixels are formed over the substrate 402. Each color filter pixel 410 includes three filters 412, 414, and 416 that are adjacent to one another and are respectively configured for three different colors (e.g., red, green, and blue). Each filter is a 5-layer thin-metal-film filter and the thickness of the dielectric layers is set to produce a desired color.

The filters 412, 414, and 416 for different colors can be configured to have the same set of metal films 404, 406, and 408. The thickness of dielectric layers 405 and 407 varies from one filter to another to produce different colors. The filter 412, for example, has the thinnest dielectric layers to produce a blue color and the filter 416 has the thickest dielectric layers to produce a red color. The dielectric layers of the filter 414 have a thickness between the thicknesses of the filters 412 and 416 to produce a green color.

The color filter array 400 can be easily fabricated by using known semiconductor processing techniques. The dielectric layers can be formed of a suitable photoresist material. Since only the thicknesses of the dielectric layers need to be changed for transmitting different colors and the metal films can be the same for different filters in each color filter pixel, only two masking processes are needed in the manufacturing process.

Figure 5A:
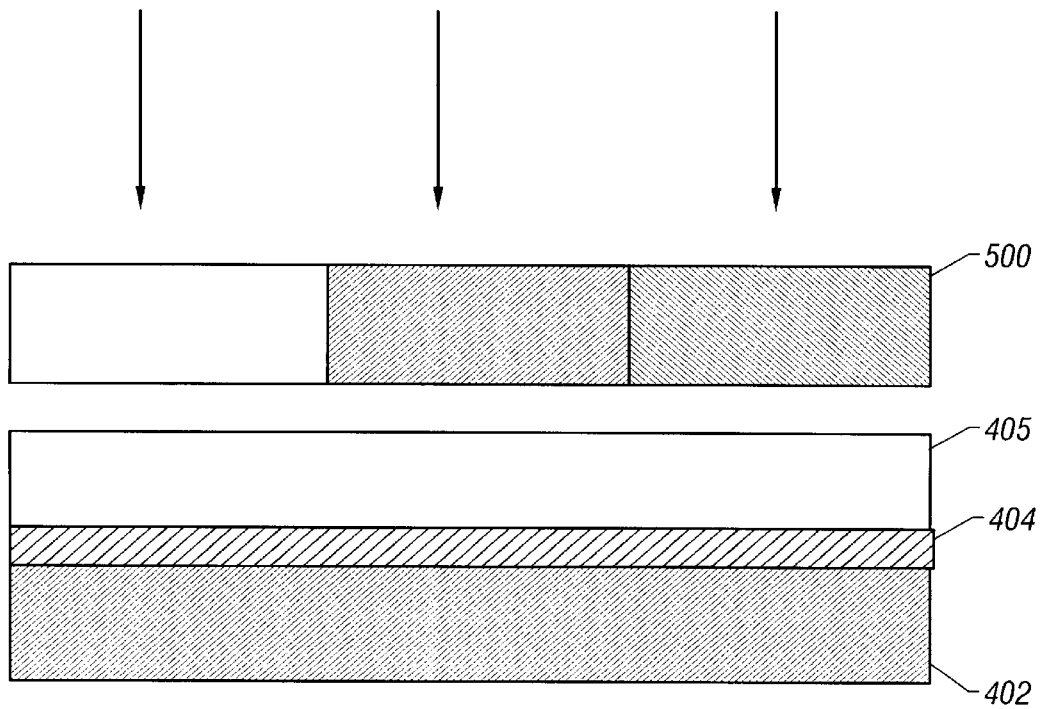
FIGS. 5A, 5B, 5C, and 5D are diagrams illustrating steps of fabrication of the color filter array of FIG. 4.

FIGS. 5A, 5B, 5C, and 5D show fabrication steps of forming a color filtering array with filters for red, green, and blue colors. First, the substrate 402 is prepared and a to first metal film 404 is formed. A first photoresist layer 405 is then formed over the first metal film 404. Next, a mask 500 with a varying gray level is used to cover the first photoresist layer 405 to expose different filter locations to different intensity levels of light during a selected exposure time. These steps are shown in FIG. 5A.

Figure 5B:
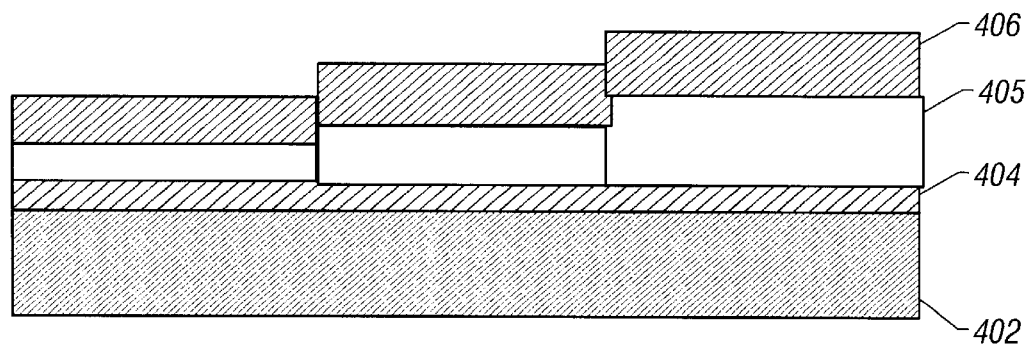

Referring to FIG. 5B, the exposed photoresist is then removed to obtain different thickness values at different filter locations in the same photoresist layer 405. A second metal film 406 of a uniform thickness is then formed to over the patterned photoresist layer 405 in a conformal manner by using, e.g., a vapor deposition process.

Figure 5C:
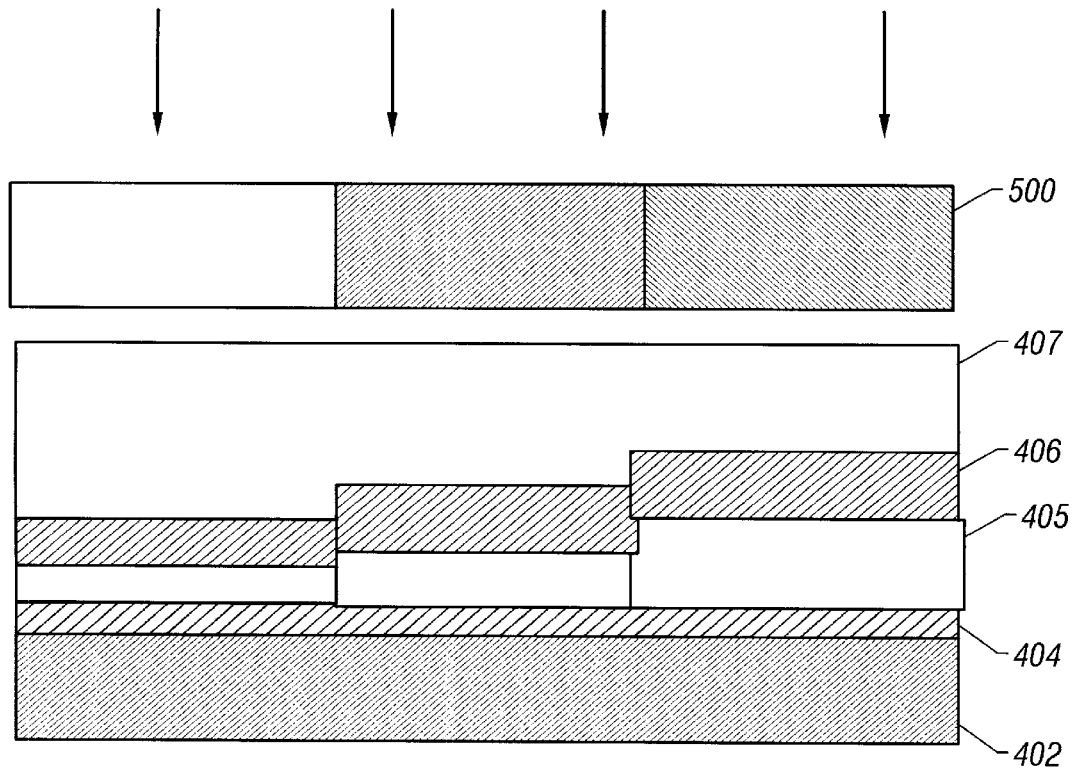
Figure 5D:
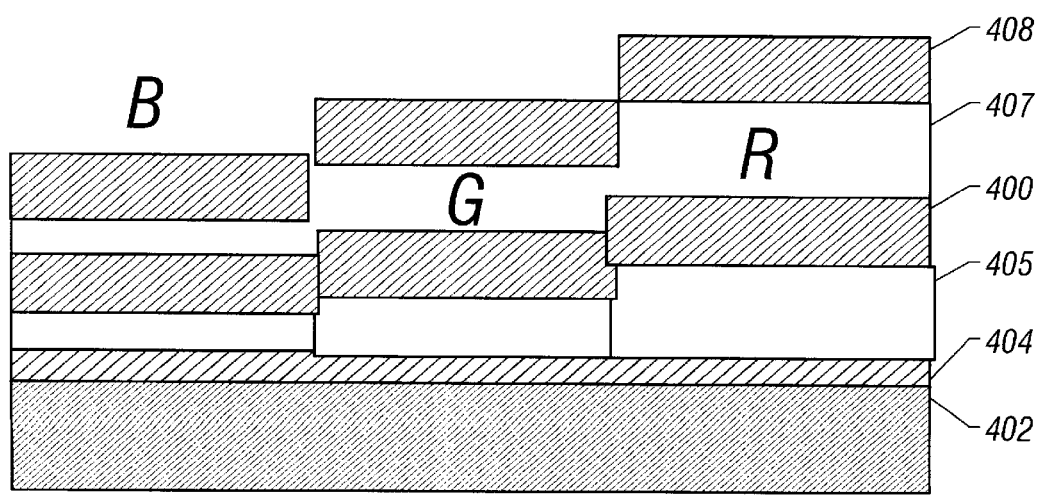

A second photoresist layer 407 is then formed over the second metal film 406 and is exposed again by using the same grey-scale mask 500 or a different grey-scale mask with the same spatial pattern but a different grey scale (FIG. 5C). The exposed photoresist is removed to form the patterned photoresist layer 407 with different thicknesses at different filter locations. Finally, a third metal film 408 of a uniform thickness is formed to conform with the patterned photoresist layer 407 (FIG. 5D). This completes the fabrication of the color filter array 400.

Figure 6:
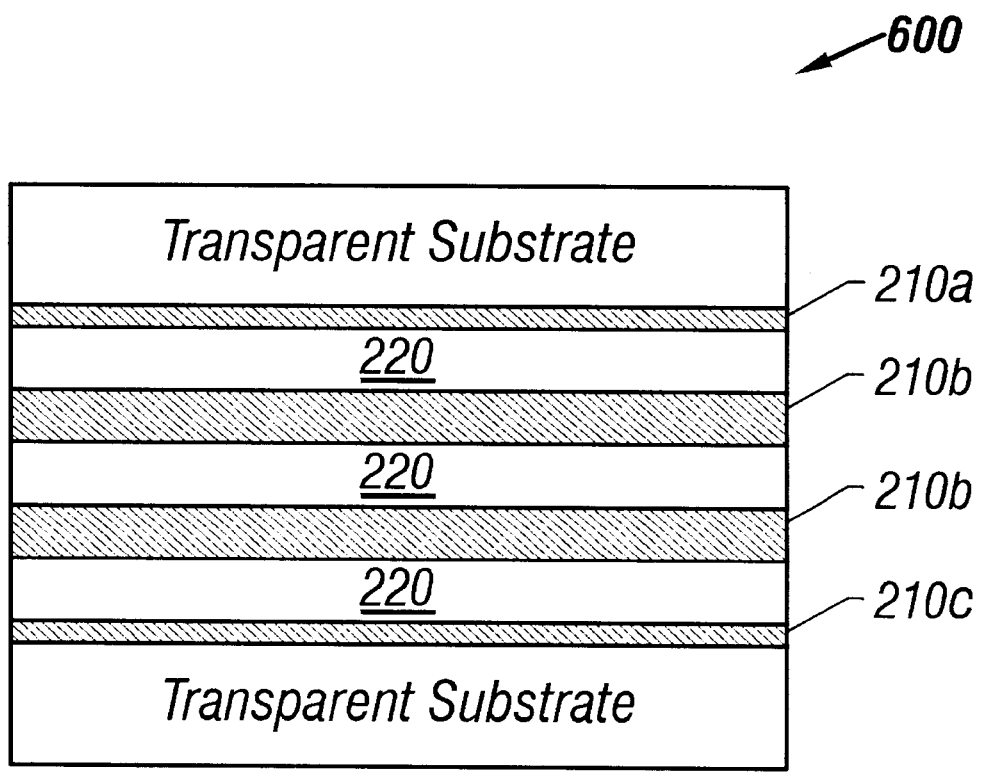
FIG. 6 is a diagram showing a thin-metal-film filter with three coupled cavities.

Although the present invention has been described in detail with reference to a 5-layer thin-metal-film interference filter, other modifications and enhancements may be made. For example, additional dielectric layers and metal films may be added. FIG. 6 shows a 7-layer filter with three coupled Fabry-Perot cavities. This improves the flexibility in configuring the spectral profile of the transmission window. In the tunable three-layer filter 100 of FIG. 1, the air gap 130 and the piezo-electric element 120 can be replaced by a layer of electro-optic material to alter the optical length of the cavity.

These and other variations and modifications are intended to be encompassed by the appended claims.

What is claimed is:

1. A filter for filtering electromagnetic radiation, comprising:

a dielectric layer having a first side and an opposite second side and having a selected thickness measured from said first side to said second side; and first and second metal films respectively disposed on said first and second sides of said dielectric layer to form an optical cavity enclosing said dielectric layer, said first and second metal films having a thickness less than a penetration depth of the radiation, wherein said optical cavity is operable to transmit radiation at a selected wavelength with a predetermined bandwidth, and said dielectric layer, said first and second metal films are configured to have a total optical thickness greater than one half of said selected wavelength and less than said selected wavelength.

2. The filter as in claim 1, wherein an optical thickness of said dielectric layer is adjustable to change said selected wavelength.

3. The filter as in claim 2, further comprising:

first and second transparent substrates on which said first and second metal films are respectively formed, wherein said dielectric layer is an air gap between said first and second metal films; and a piezo-electric element engaged to said first and second transparent substrates and operable to change a spacing therebetween in response to a control electrical signal, thereby changing said selected thickness of said air gag to tune said selected wavelength.

4. The filter as in claim 3, wherein said first and second metal films include silver for transmission in the visible spectral range.

5. The filter as in claim 3, wherein said first and second metal films include potassium for transmission in the infrared spectral range.

6. The filter as in claim 2, wherein said dielectric layer is formed of an opto-electric material whose index of refraction varies with a control electrical signal.

7. An optical filter for transmitting a selected spectral component in an input optical beam, comprising:

a first metal layer configured to have a thickness less than a penetration depth for said input optical beam;

a first dielectric layer formed on said first metal layer;

a second metal layer formed on said first dielectric layer and configured to have a thickness less than a penetration depth for said input light beam;

a second dielectric layer formed on said second metal layer; and a third metal layer formed on said second dielectric layer and configured to have a thickness less than a penetration depth for said input light beam, wherein said first and second dielectric layers are configured to allow for transmission of said selected spectral component.

8. The optical filter as in claim 7, wherein said first and third metal layers have a thickness less than a thickness of said second metal layer.

9. The optical filter as in claim 7, wherein said first, second and third metal layers are formed of silver and are less than about 100 nm thick.

10. The optical filter as in claim 7, wherein said first and second dielectric layers are formed of $MgF_2$, $SiO_2$, NaF, or LiF.

11. An optical filter for filtering a white input beam to produce a colored transmitted beam, comprising an array of filter elements disposed relative to one another and formed on a substrate, each filter element comprising three adjacent color filters formed of a stack of alternating metal layers and dielectric layers on said substrate for transmitting different colors, wherein each color filter includes:

a first metal layer formed on said substrate and configured to have a thickness less than a penetration depth for said input beam;

a first dielectric layer formed on said first metal layer;

a second metal layer formed on said first dielectric layer and configured to have a thickness less than a penetration depth for said input beam;

a second dielectric layer formed on said second metal layer; and a third metal layer formed on said second dielectric layer and configured to have a thickness less than a penetration depth for said input beam, wherein said first and second dielectric layers are configured to allow for transmission of a selected spectral component in said input beam.

12. The optical filter as in claim 11, wherein said first and third metal layers in different color filters have a first thickness, said second metal layers in different color filters have a second thickness, and said dielectric layers in different color filters have different thickness values.

13. The optical filter as in claim 11, wherein said substrate includes an array of spatial light modulators.

* * * * *